United States Patent
Wang et al.

(10) Patent No.: US 6,798,237 B1
(45) Date of Patent: Sep. 28, 2004

(54) ON-CHIP IMPEDANCE MATCHING CIRCUIT

(75) Inventors: Xiaobao Wang, Santa Clara, CA (US); Chiakang Sung, Milpitas, CA (US); Bonnie I. Wang, Cupertino, CA (US); Khai Nguyen, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 10/044,365

(22) Filed: Jan. 11, 2002

Related U.S. Application Data

(60) Provisional application No. 60/315,965, filed on Aug. 29, 2001.

(51) Int. Cl.[7] .............................................. H03K 17/16
(52) U.S. Cl. ........................................ 326/30; 326/83
(58) Field of Search ................................ 326/30, 82, 83

(56) References Cited

U.S. PATENT DOCUMENTS

| | | | |
|---|---|---|---|
| 4,719,369 A | * | 1/1988 | Asano et al. ............... 307/443 |
| 4,954,729 A | | 9/1990 | Urai |
| 5,111,081 A | | 5/1992 | Atallah |
| 5,134,311 A | | 7/1992 | Biber et al. |
| 5,164,663 A | | 11/1992 | Alcorn |
| 5,179,300 A | | 1/1993 | Rolandi et al. |
| 5,359,235 A | | 10/1994 | Coyle et al. |
| 5,374,861 A | | 12/1994 | Kubista |
| 5,592,510 A | | 1/1997 | Van Brunt et al. |
| 5,602,494 A | | 2/1997 | Sundstrom |
| 5,623,216 A | | 4/1997 | Penza et al. |
| 5,726,582 A | | 3/1998 | Hedberg |
| 5,726,583 A | | 3/1998 | Kaplinsky |
| 5,764,080 A | | 6/1998 | Huang et al. |
| 5,864,715 A | | 1/1999 | Zani et al. |
| 5,939,896 A | | 8/1999 | Hedberg |
| 5,955,911 A | | 9/1999 | Drost et al. |
| 5,970,255 A | | 10/1999 | Tran et al. |
| 6,008,665 A | | 12/1999 | Kalb et al. |
| 6,026,456 A | | 2/2000 | Ilkbahar |

(List continued on next page.)

OTHER PUBLICATIONS

Altera, Apex 20K "Programmable Logic Device Family," Altera Corporation, Ver. 1.1, May 2001.
Altera, Apex II "Programmable Logic Device Family," Altera Corporation, Ver. 1.1, May 2001.
Esch and Manley, Theory and Design of CMOS HSTL I/O Pads, The Hewlett Packard Journal, Aug. 1998.
Xilinx, "Virtex–II 1.5V Field Programmable Gate Arrays," Xilinx, DSO3102 (v1.5), Apr. 2, 2001.
Bendak, M. et al. (1996). "CMOS VLSI Implementation of Gigabyte/second computer network links," Dept. of Electrical and Computer Engineering, University of California at San Diego, La Jolla, CA 92093–0407, *IEEE International Symposium on Circuits and Systems* pp. 269–272.
Boni, A. et al. (2001). "LVDS I/O Interface for Gb/s–per–Pin Operation in 0.35–um CMOS," IEEE Journal of Solid–State Circuits, 36(4):706–711.

*Primary Examiner*—Daniel Chang
(74) *Attorney, Agent, or Firm*—Townsend and Townsend and Crew LLP; Steven J. Cahill

(57) ABSTRACT

Integrated circuits with on-chip impedance matching techniques, which greatly reduce the number of off-chip resistors that are coupled to the integrated circuit, are provided. On-chip impedance matching circuits of the present invention are associated with each of a plurality of I/O pins on an integrated circuit. Circuitry of the present invention may include a resistor divider that has a resistor and an on-chip transistor. The resistance of the on-chip transistor and a voltage output signal of the resistor divider vary with process, temperature, and voltage of the integrated circuit. The effective channel W/L ratio of the impedance matching circuit changes in response to the voltage output signal of the resistor divider, so that changes in the impedance of the impedance matching circuit caused by the variations in process, temperature, and voltage are minimized.

26 Claims, 8 Drawing Sheets

U.S. PATENT DOCUMENTS

| | | |
|---|---|---|
| 6,037,798 A | 3/2000 | Hedberg |
| 6,049,255 A | 4/2000 | Hagberg et al. |
| 6,064,224 A | 5/2000 | Esch, Jr. et al. |
| 6,087,847 A | 7/2000 | Mooney et al. |
| 6,097,208 A | 8/2000 | Okajima et al. |
| 6,100,713 A | 8/2000 | Kalb et al. |
| 6,118,310 A | 9/2000 | Esch, Jr. |
| 6,147,520 A | 11/2000 | Kothandaraman et al. |
| 6,154,060 A | 11/2000 | Morriss |
| 6,157,206 A | 12/2000 | Taylor et al. |
| 6,181,157 B1 | 1/2001 | Fiedler |
| 6,236,231 B1 | 5/2001 | Nguyen et al. |
| 6,252,419 B1 | 6/2001 | Sung et al. |
| 6,329,836 B1 | 12/2001 | Drost et al. |
| 6,356,106 B1 | 3/2002 | Greeff et al. |
| 6,362,644 B1 | 3/2002 | Jeffery et al. |
| 6,366,128 B1 | 4/2002 | Ghia et al. |
| 6,411,126 B1 | 6/2002 | Tinsley et al. |
| 6,424,169 B1 | 7/2002 | Partow et al. |
| 6,445,245 B1 | 9/2002 | Schultz et al. |
| 6,448,813 B2 | 9/2002 | Garlepp et al. |
| 6,466,063 B2 | 10/2002 | Chen |
| 6,489,837 B2 | 12/2002 | Schultz et al. |

* cited by examiner

ON-CHIP IMPEDANCE MATCHING CIRCUIT

CROSS-REFERENCES TO RELATED APPLICATIONS

This application claims the benefit of U.S. Provisional Patent Application No. 60/315,965, filed Aug. 29, 2001, which is hereby incorporated by reference herein.

BACKGROUND OF THE INVENTION

The present invention relates to on-chip impedance matching circuits, and more particularly, to on-chip impedance matching circuits that are sensitive to process, voltage, and temperature variations.

Prior art circuits have provided off-chip impedance matching circuits that reduce the e; reflection of signals on transmission lines. Off-chip impedance matching circuits typically include one or more off-chip resistors. The off-chip resistors are coupled to an input/output (I/O) pin of an integrated circuit to provide impedance matching.

Some integrated circuit have hundreds of I/O pins that require impedance matching circuitry. In these integrated circuits, a separate impedance matching resistor must be coupled to each of the I/O pins. Hundreds of impedance matching resistors must be coupled to such an integrated circuit to provide adequate impedance matching. Thus, prior art off-chip impedance matching circuits substantially increase the amount of board space required.

BRIEF SUMMARY OF THE INVENTION

The present invention provides integrated circuits with on-chip impedance matching techniques, which greatly reduce the number of off-chip resistors that are coupled to the integrated circuit. On-chip impedance matching circuits of the present invention are associated with a plurality of I/O pins on an integrated circuit. Circuitry of the present invention may include a resistor divider that has a resistor and an on-chip transistor. The resistance of the on-chip transistor and a voltage output signal of the resistor divider vary with process, temperature, and voltage of the integrated circuit. The effective channel W/L ratio of the impedance matching circuit changes in response to the voltage output signal of the resistor divider, so that changes in the impedance of the impedance matching circuit caused by the variations in process, temperature, and/or voltage are minimized.

DETAILED DESCRIPTION OF THE INVENTION

Figure 1:
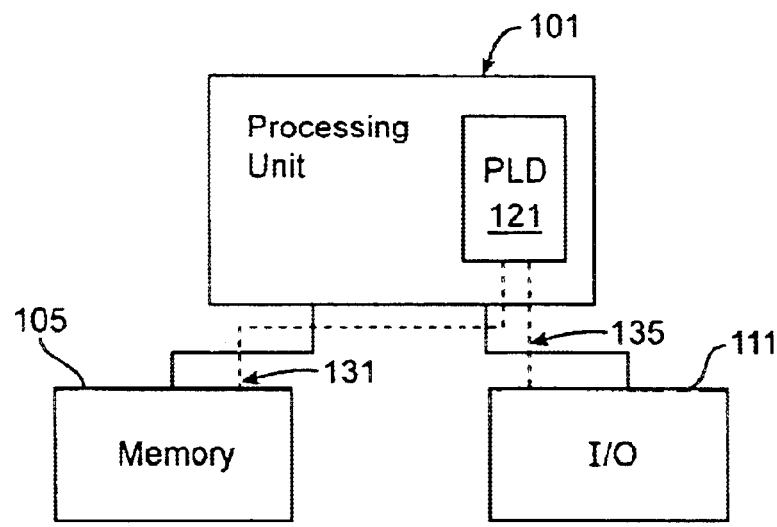
FIG. 1 is diagram of a digital system with a programmable logic integrated circuit.

FIG. 1 shows a block diagram of a system within which the present invention may be embodied. The system may be provided on a single board, on multiple boards, or even within multiple enclosures. FIG. 1 illustrates a system 101 in which a programmable logic device 121 may be utilized. Programmable logic devices are sometimes referred to as a PALs, PLAs, FPLAs, PLDs, CPLDs, EPLDs, EEPLDs, LCAs, or FPGAs and are well-known integrated circuits that provide the advantages of fixed integrated circuits with the flexibility of custom integrated circuits. Such devices allow a user to electrically program standard, off-the-shelf logic elements to meet a user's specific needs. Programmable logic devices are currently represented by, for example, Altera's MAX®, FLEX®, and APEX™ series of PLDs. Programmable logic integrated circuits and their operation are well known to those of skill in the art.

In the particular embodiment of FIG. 1, a processing unit 101 is coupled to a memory 105 and an I/O 111 and incorporates a programmable logic device (PLD) 121. PLD 121 may be specially coupled to memory 105 through connection 131 and to I/O 111 through connection 135. The system may be a programmed digital computer system, digital signal processing system, specialized digital switching network, or other processing system. Moreover, such systems may be designed for a wide variety of applications such as, merely by way of example, telecommunications systems, automotive systems, control systems, consumer electronics, personal computers, and others.

Processing unit 101 may direct data to an appropriate system component for processing or storage, execute a program stored in memory 105 or input using I/O 111, or other similar function. Processing unit 101 may be a central processing unit (CPU), microprocessor, floating point coprocessor, graphics coprocessor, hardware controller, microcontroller, programmable logic device programmed for use as a controller, or other processing unit. Furthermore, in many embodiments, there is often no need for a CPU. For example, instead of a CPU, one or more PLDs 121 may control the logical operations of the system. In some embodiments, processing unit 101 may even be a computer system. Memory 105 may be a random access memory (RAM), read only memory (ROM), fixed or flexible disk media, PC Card flash disk memory, tape, or any other storage retrieval means, or any combination of these storage retrieval means. PLD 121 may serve many different purposes within the system in FIG. 1. PLD 121 may be a logical building block of processing unit 101, supporting its internal and external operations. PLD 121 is programmed to implement the logical functions necessary to carry on its particular role in system operation.

Figure 2:
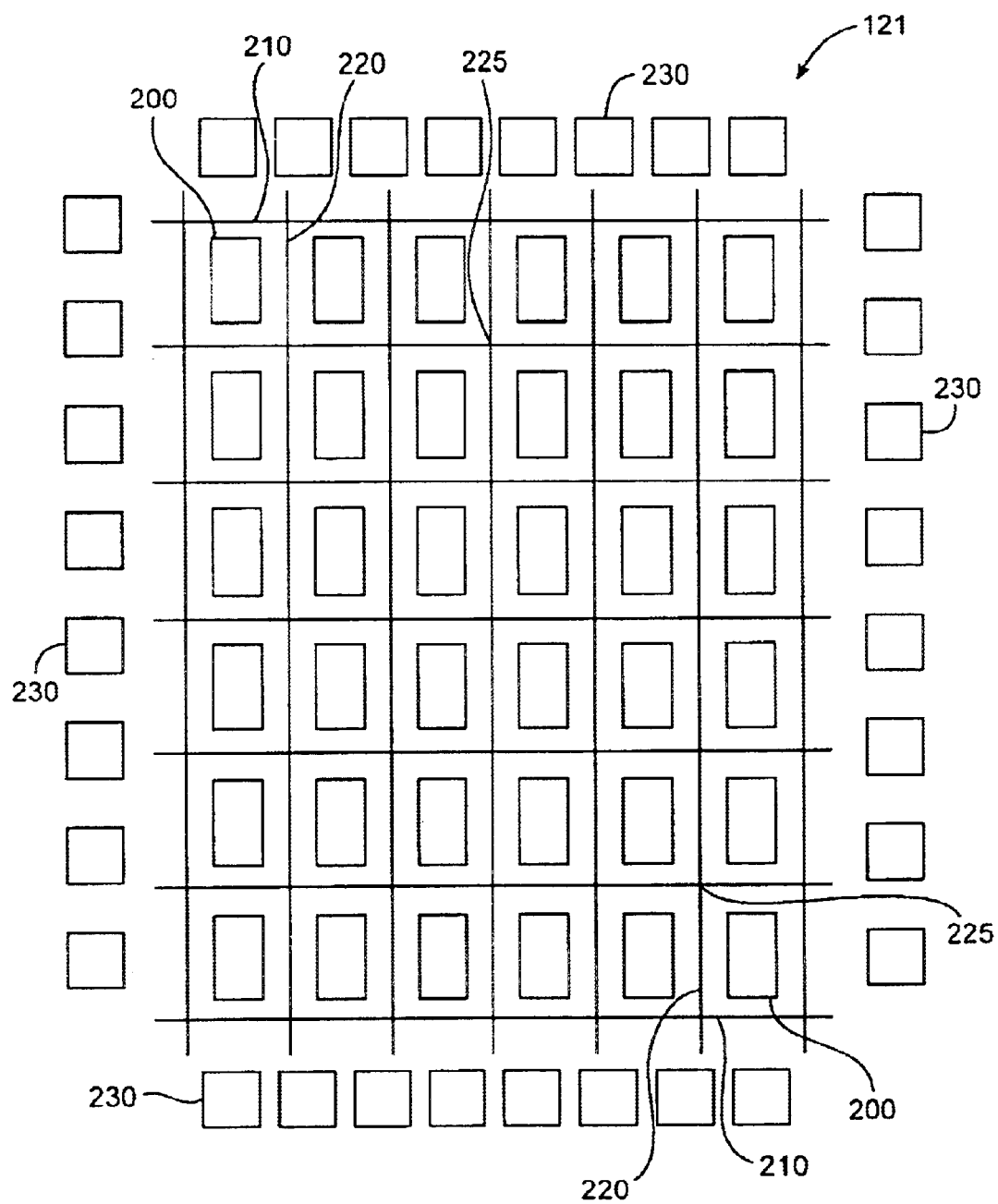
FIG. 2 is a diagram showing an architecture of a programmable logic integrated circuit.

FIG. 2 is a simplified block diagram of an overall internal architecture and organization of PLD 121 of FIG. 1. Many details of PLD architecture, organization, and circuit design are not necessary for an understanding of the present invention and such details are not shown in FIG. 2.

FIG. 2 shows a six-by-six two-dimensional array of thirty-six logic array blocks (LABs) 200. LAB 200 is a physically grouped set of logical resources that is configured or programmed to perform logical functions. The internal architecture of a LAB will be described in more detail below in connection with FIG. 3. PLDs may contain any arbitrary number of LABs, more or less than shown in PLD 121 of FIG. 2. Generally, in the future, as technology advances and improves, programmable logic devices with greater numbers of logic array blocks will undoubtedly be created. Furthermore, LABs 200 need not be organized in a square matrix or array; for example, the array may be organized in a five-by-seven or a twenty-by-seventy matrix of LABs.

LAB 200 has inputs and outputs (not shown) which may or may not be programmably connected to a global interconnect structure, comprising an array of global horizontal interconnects (GHs) 210 and global vertical interconnects (GVs) 220. Although shown as single lines in FIG. 2, each GH 210 and GV 220 line may represent a plurality of signal conductors. The inputs and outputs of LAB 200 are programmably connectable to an adjacent GH 210 and an adjacent GV 220. Utilizing GH 210 and GV 220 interconnects, multiple LABs 200 may be connected and combined to implement larger, more complex logic functions than can be realized using a single LAB 200.

In one embodiment, GH 210 and GV 220 conductors may or may not be programmably connectable at intersections 225 of these conductors. Moreover, GH 210 and GV 220 conductors may make multiple connections to other GH 210 and GV 220 conductors. Various GH 210 and GV 220 conductors may be programmably connected together to create a signal path from a LAB 200 at one location on PLD 121 to another LAB 200 at another location on PLD 121. A signal may pass through a plurality of intersections 225. Furthermore, an output signal from one LAB 200 can be directed into the inputs of one or more LABs 200. Also, using the global interconnect, signals from a LAB 200 can be fed back into the same LAB 200. In specific embodiments of the present invention, only selected GH 210 conductors are programmably connectable to a selection of GV 220 conductors. Furthermore, in still further embodiments, GH 210 and GV 220 conductors may be specifically used for passing signal in a specific direction, such as input or output, but not both.

In other embodiments, the programmable logic integrated circuit may include special or segmented interconnect that is connected to a specific number of LABs and not necessarily an entire row or column of LABs. For example, the segmented interconnect may programmably connect two, three, four, five, or more LABs.

The PLD architecture in FIG. 2 further shows at the peripheries of the chip, input-output drivers 230. Input-output drivers 230 are for interfacing the PLD to external, off-chip circuitry. FIG. 2 shows thirty-two input-output drivers 230; however, a PLD may contain any number of input-output drivers, more or less than the number depicted. Each input-output driver 230 is configurable for use as an input driver, output driver, or bidirectional driver. In other embodiments of a programmable logic integrated circuit, the input-output drivers may be embedded with the integrated circuit core itself This embedded placement of the input-output drivers may be used with flip chip packaging and will minimize the parasitics of routing the signals to input-output drivers.

Figure 3:
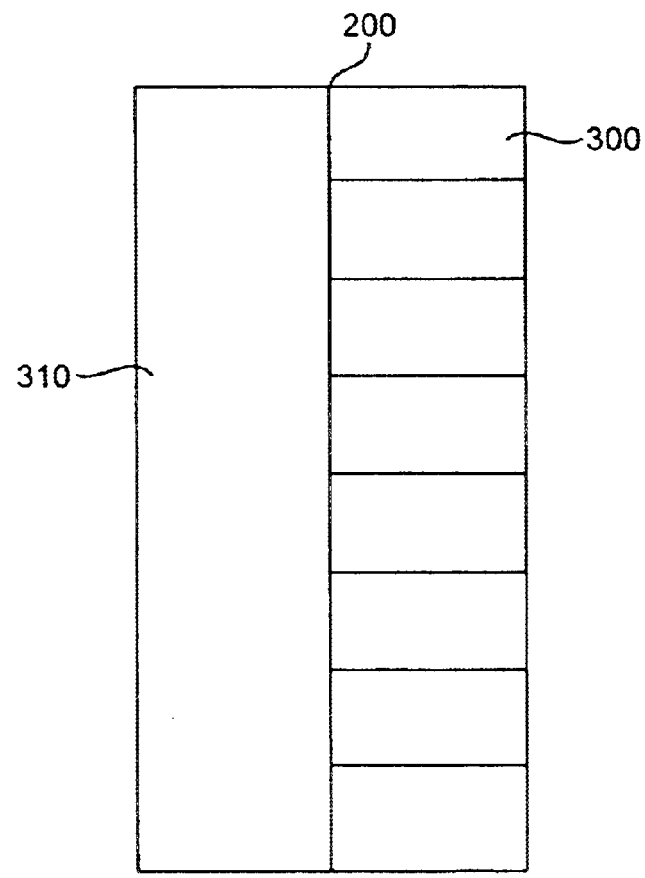
FIG. 3 is a simplified block diagram of a logic array block (LAB)

FIG. 3 shows a simplified block diagram of LAB 200 of FIG. 2. LAB 200 is comprised of a varying number of logic elements (LEs) 300, sometimes referred to as "logic cells," and a local (or internal) interconnect structure 310. LAB 200 has eight LEs 300, but LAB 200 may have any number of LEs, more or less than eight.

A general overview of LE 300 is presented here. LE 300 is the smallest logical building block of a PLD. Signals external to the LAB, such as from GHs 210 and GVs 220, are programmably connected to LE 300 through local interconnect structure 310. In one embodiment, LE 300 incorporates a function generator that is configurable to provide a logical function of a number of variables, such as a four-variable Boolean operation. As well as combinatorial functions, LE 300 also provides support for sequential and registered functions using, for example, D flip-flops.

LE 300 provides combinatorial and registered outputs that are connectable to the GHs 210 and GVs 220, outside LAB 200. Furthermore, the outputs from LE 300 may be internally fed back into local interconnect structure 310; through local interconnect structure 310, an output from one LE 300 may be programmably connected to the inputs of other LEs 300, without using the global interconnect structure's GHs 210 and GVs 220. Local interconnect structure 310 allows short-distance interconnection of LEs, without utilizing the limited global resources, GHs 210 and GVs 220.

Figure 4:
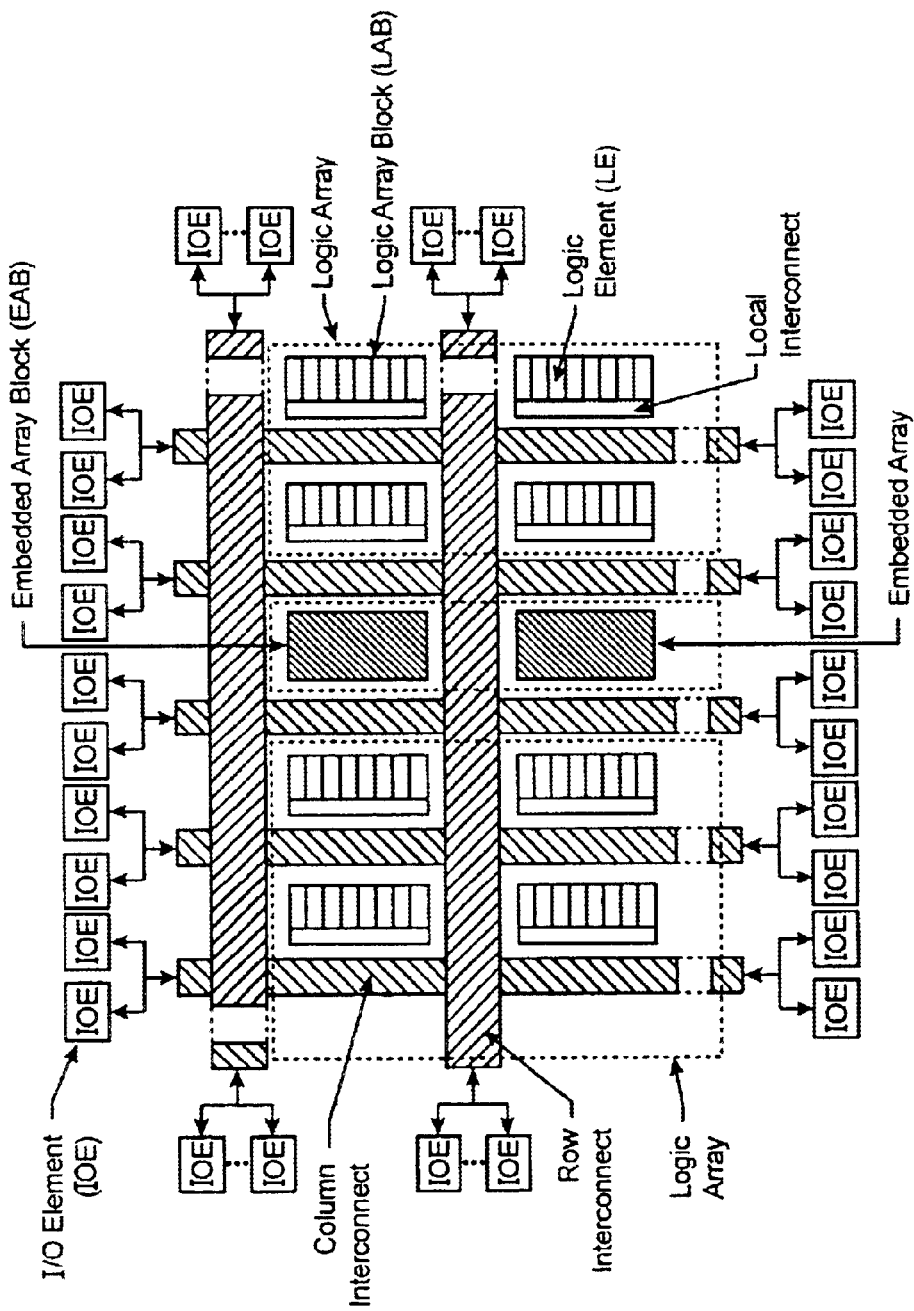
FIG. 4 shows an architecture of a programmable logic integrated circuit with embedded array blocks (EABs)
Figure 5:
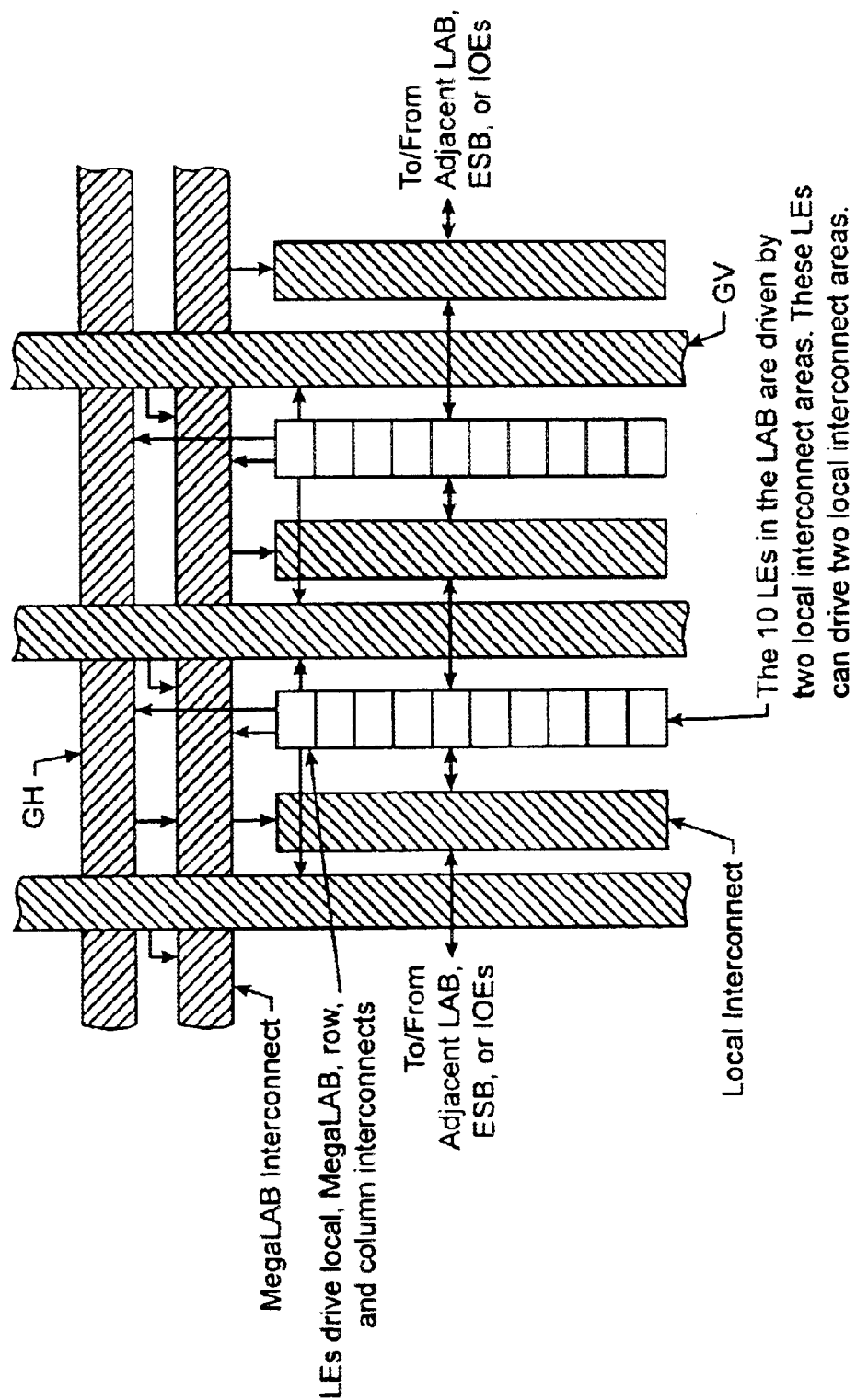
FIG. 5 shows an architecture of a programmable logic integrated circuit with megaLABs.

FIG. 4 shows a PLD architecture similar to that in FIG. 2. The architecture in FIG. 4 further includes embedded array blocks (EABs). EABs contain user memory, a flexible block of RAM. FIG. 5 shows a further embodiment of a programmable logic integrated circuit architecture. FIG. 5 only shows a portion of the architecture. The features shown in FIG. 5 are repeated horizontally and vertically as needed to create a PLD of any desired size. In this architecture, a number of LABs are grouped together into a megaLAB. In a specific embodiment, a megaLAB has sixteen LABs, each of which has ten LEs. There can be any number of mega-LABs per PLD. A megaLAB is programmably connected using a megaLAB interconnect. This megaLAB interconnect may be considered another interconnect level that is between the global interconnect and local interconnect levels. The megaLAB interconnect can be programmably connected to GVs, GHs, and the local interconnect of each LAB of the megaLAB. Compared to the architecture of FIG. 2, this architecture has an additional level of interconnect, the megaLAB interconnect. In a specific implementation, a megaLAB also includes an embedded system block (ESB) to implement a variety of memory functions such as CAM, RAM, dual-port RAM; ROM, and FIFO functions.

Figure 6A:
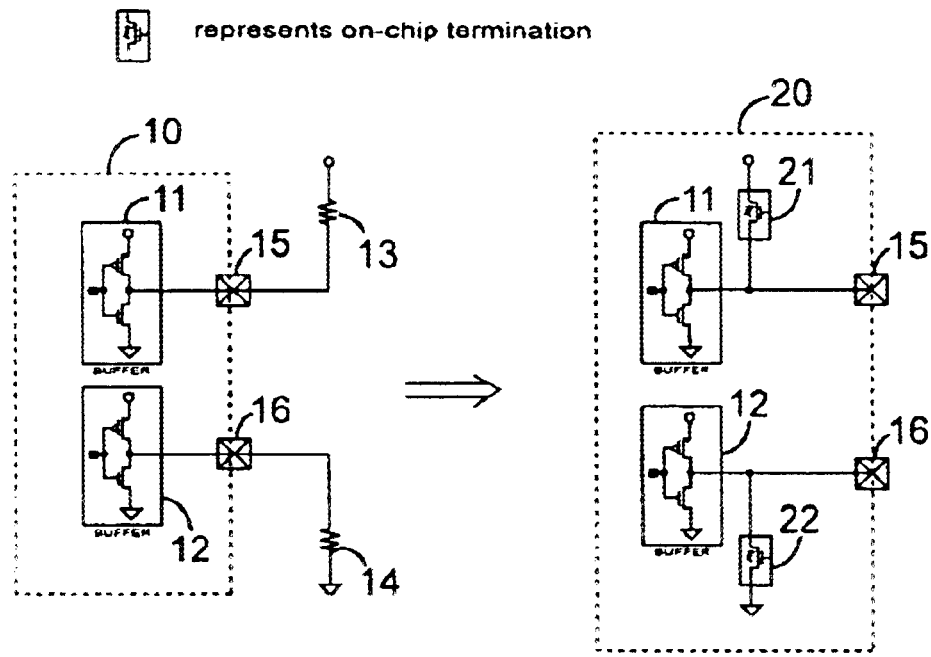
FIGS. 6A–6C is a schematic illustrating various integrated circuits that have on-chip impedance matching circuits, in accordance with the present invention.
Figure 6B:
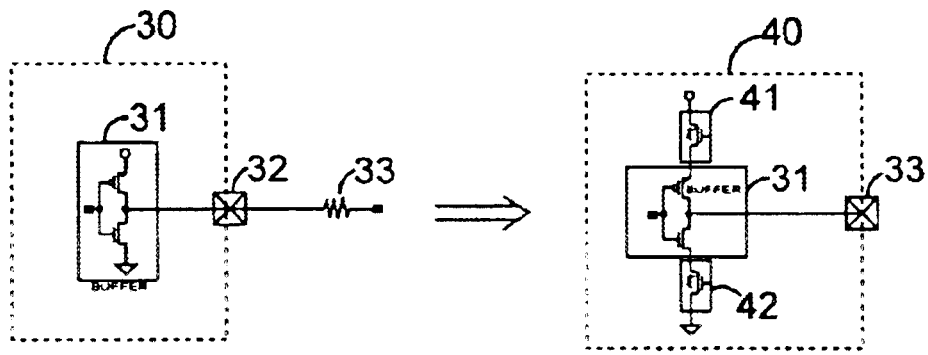
Figure 6C:
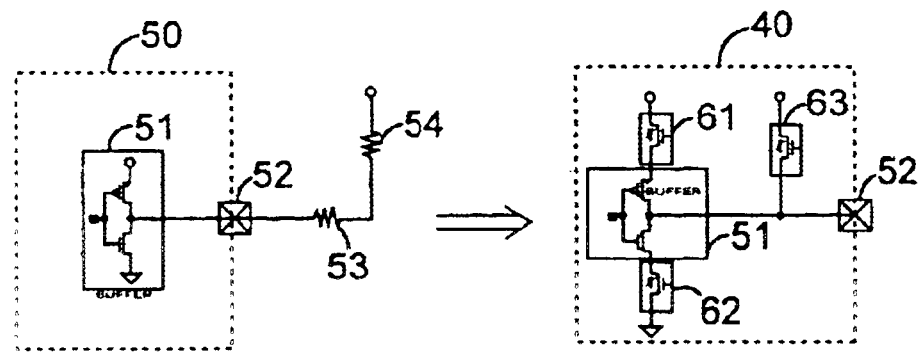

Three embodiments of on-chip impedance matching circuits of the present invention are illustrated in FIGS. 6A–6C. An integrated circuit 10 shown in FIG. 6A includes buffers 11 and 12, which each have outputs coupled to input/output (I/O) pins 15 and 16, respectively. Buffers 11 and 12 buffer signals received at and transmitted to pins 15 and 16. Each of buffers 11 and 12 includes an inverter. The inverters each have a p-channel and an n-channel field-effect transistors coupled in series between a power supply and ground. Integrated circuit 10 may be, for example, a programmable logic device, an application specific integrated circuit (ASIC), a memory circuit, or a microprocessor.

In prior art circuits, off-chip resistors 13 and 14 are used to provide impedance matching at pins 15 and 16, respectively. Resistor 13 is coupled between pin 15 and a supply voltage in parallel with a first signal line. Resistor 14 is coupled between pin 16 and ground in parallel with a second signal line.

Using techniques of the present invention, off-chip resistors 13 and 14 can be replaced with on-chip impedance matching circuits 21 and 22, respectively. Impedance matching 715 circuit 21 is coupled between pin 15 and a power supply inside integrated circuit 20 as shown in FIG. 6A. Impedance matching circuit 22 is coupled between pin 16 and ground inside integrated circuit 20 as shown in FIG. 6A.

Impedance matching circuits 21 and 22 are coupled in parallel with signal lines that are coupled to pins 15 and 16, respectively. Impedance matching circuits 21 and 22 reduce the reflection of signals on signal lines that are coupled to pins 15 and 16, respectively. Further details of on-chip impedance matching circuits are discussed below.

An integrated circuit 30 shown in FIG. 6B includes buffer circuit 31, which is coupled to I/O pin 32. Buffer circuit 31 also includes a p-channel and an n-channel field-effect transistors coupled between a supply voltage and ground. In prior art circuits, off-chip resistor 33 is used to provide impedance matching. Resistor 33 is coupled in series between pin 32 and a signal line.

Using techniques of the present invention, off-chip resistor 33 can be replaced with on-chip impedance matching circuits 41 and 42. Impedance matching circuit 41 is coupled between an on-chip power supply source and buffer circuit 31 in integrated circuit 40. Impedance matching circuit 42 is coupled between ground and buffer circuit 31 in integrated circuit 40. Impedance matching circuit 41 is coupled in series with a signal line coupled to pin 33 when the p-channel transistor of buffer 31 is ON. Impedance matching circuit 42 is coupled in series with a signal line coupled to pin 33 when the n-channel transistor of buffer 31 is ON. Impedance matching circuits 41 and 42 reduce the reflection of signals on a signal line coupled to pin 33.

An integrated circuit 50 shown in FIG. 6C includes buffer circuit 51, which is coupled to I/O pin 52. Buffer circuit 51 also includes a p-channel and an n-channel field-effect transistors coupled between a supply voltage and ground. In prior art circuits, off-chip resistors 53 and 54 are used to provide impedance matching. Resistor 53 is coupled in series between pin 52 and a signal line. Resistor 54 is coupled in parallel between the signal line and a supply voltage.

Using techniques of the present invention, off-chip resistors 53 and 54 can be replaced with on-chip impedance matching circuits 61–63. Impedance matching circuit 63 is coupled between pin 52 and a supply voltage. On-chip impedance matching circuit 63 replaces resistor 54. Impedance matching circuit 61 is coupled between a supply voltage and buffer 51, and impedance matching circuit 62 is coupled between buffer 51 and ground. On-chip impedance matching circuits 61–62 replace resistor 53.

Figure 7:
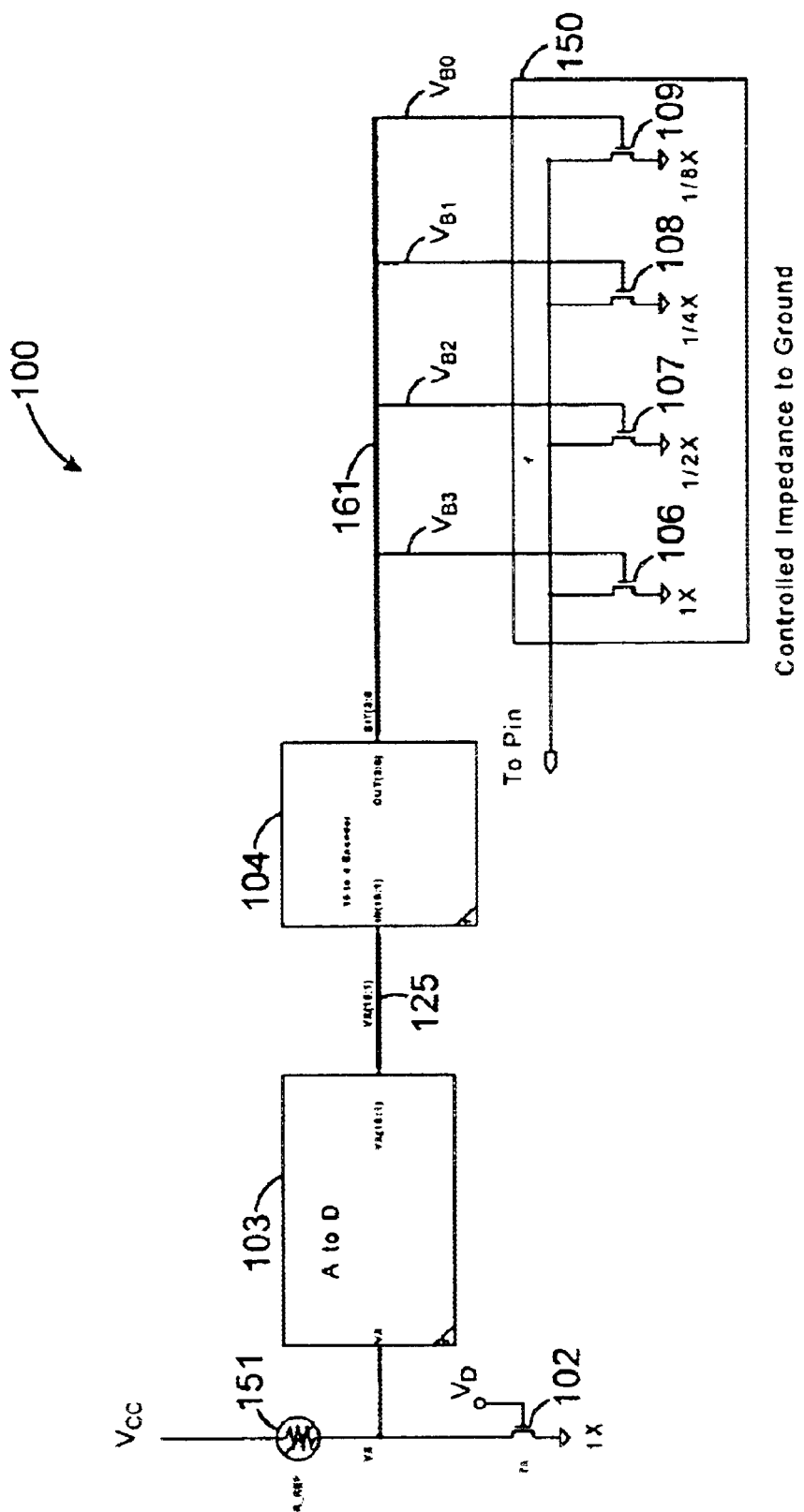
FIG. 7 is a schematic illustrating an embodiment of an on-chip impedance matching circuit, in accordance with the present invention.

FIG. 7 illustrates an embodiment of an on-chip impedance matching circuit of the present invention. Impedance control circuit 100 includes reference resistor 151, field effect transistor (FET) 102, analog-to-digital converter 103, digital encoder circuit 104, and on-chip impedance matching circuit 150. Reference resistor 151 is coupled between a supply voltage $V_{CC}$ and an input to analog-to-digital converter 103. Transistor 102 is coupled between the input of analog-to-digital converter 103 and ground. The gate terminal of transistor 102 is coupled to voltage source $V_D$. Voltage source $V_D$ controls the current through transistor 102 and the resistance between the drain and the source of transistor 102 ($R_{DS}$) when transistor 102 is ON. Transistor 102 may operate in the linear region or in the saturation region.

Reference resistor 151 may be an off-chip resistor that is coupled to a pin of the integrated circuit. Resistor 151 may be a precision resistor. Transistor 102 is an on-chip transistor. The ON resistance ($R_{DS}$) of on-chip transistor 102 varies with the temperature of the integrated circuit, the process techniques used to fabricate the integrated circuit, and variations in the supply voltage $V_{CC}$ and voltage source $V_D$.

Reference resistor 151 and transistor 102 form a voltage divider that has a voltage output signal $V_X$. $V_X$ is proportional to the resistance ratio of resistor 151 and the $R_{DS}$ of transistor 102 according to the following equation:

$$V_X = V_{CC} \frac{R_{DS}}{R_{DS} + R_{151}} \quad (1)$$

The voltage output signal $V_X$ is indicative of the resistance ($R_{DS}$) of transistor 102 and the resistance $R_{151}$ of resistor 151. Voltage output signal $V_X$ varies as the resistance of transistor 102 changes with variations in chip process, temperature, and voltage. Voltage output signal $V_X$ is provided to an input of analog-to-digital converter 103.

Figure 8:
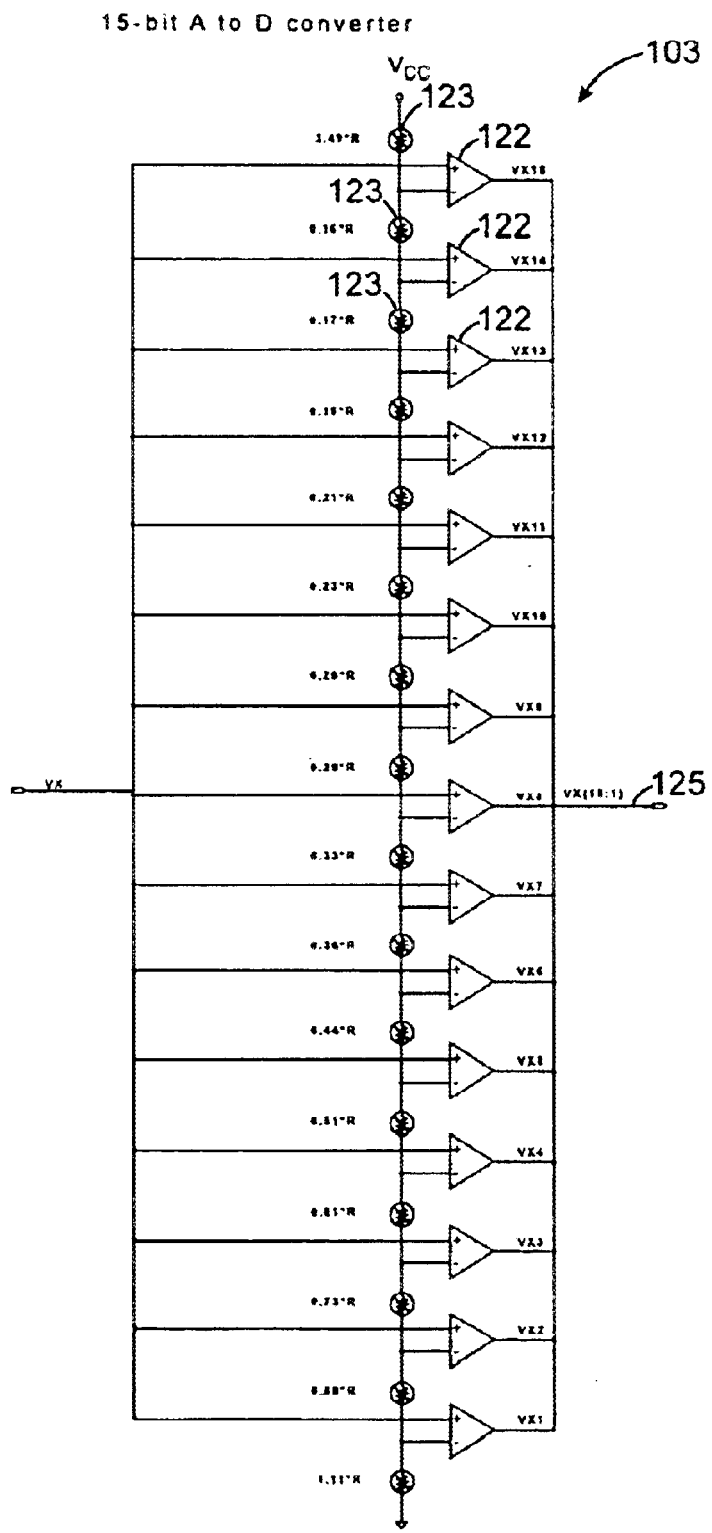
FIG. 8 is a schematic illustrating an embodiment of an analog-to-digital converter for use with an on-chip impedance matching circuit, in accordance with the present invention.

A detailed schematic of an embodiment of analog-to-digital (A-to-D) converter 103 is shown in FIG. 8. Circuit 103 shown in FIG. 8 is merely an example of an A-to-D converter that can be used with the present invention. Other suitable A-to-D converters that are well known in the art may be used instead.

A-to-D converter 103 comprises fifteen comparators 122 and sixteen resistors 123. Voltage signal $V_X$ is coupled to the non-inverting input terminals of each of comparators 122. Resistors 123 are coupled in series between supply voltage $V_{CC}$ and ground. The inverting input terminals of comparators 122 are coupled between two of resistors 123 as shown in FIG. 8. The fifteen output signals of fifteen comparators 122 are $V_{X1}$–$V_{X15}$. The output terminals of comparators 122 are coupled to a bus line 125 that comprises at least 15 signal lines for output signals $V_{X1}$–$V_{X15}$.

Resistors 123 comprise a resistor divider that determines a threshold voltage at the inverting inputs of each of comparators 122. When voltage signal $V_X$ is greater than the threshold voltage of one of comparators 122, the output signal of that comparator is pulled up to $V_{CC}$ (i.e., a logic HIGH). When voltage signal $V_X$ is less than the threshold voltage of one of comparators 122, the output signal of that comparator is pulled to ground (i.e., a logic LOW). Thus, the output signals $V_{X1}$–$V_{X15}$ of comparators 122 comprise 15 HIGH or LOW logic signals.

The resistance of resistors 123 may be selected, for example, using the ratios shown in FIG. 8 with respect to a resistance R. The resistor ratios in FIG. 8 are shown for purposes of illustration. Other resistor values and ratios may be selected.

The ratios of resistors 123 and voltage signal $V_X$ determine which of output signals $V_{X1}$–$V_{15}$ are HIGH and which of output signals $V_{X1}$–$V_{15}$ are LOW. Voltage signal $V_X$ vanes when changes in temperature, voltages, and process fabrication techniques cause changes in the $R_{DS}$ resistance of transistor 102 over time and from chip-to-chip. As voltage signal $V_X$ changes, the values of output signals $V_{X1}$–$V_{15}$ may change.

The example resistor ratios shown in FIG. 8 may be used as an illustration, as is now discussed. The resistance of all of resistors 123 adds up 10R. Thus, if $V_X$ is greater than $(1.11/10)V_{CC}$ but less than $(1.11+0.89)V_{CC}/10$ then output signal $V_{X1}$ is HIGH, and output signals $V_{X2}$–$V_{X15}$ are LOW. If $V_X$ rises above $(1.11+0.89+0.73)V_{CC}/10$ but is less than $(1.11+0.89+0.73+0.61)V_{CC}/10$ then output signals $V_{X1}$–$V_{X3}$ are HIGH, and output signal $V_{X4}$–$V_{X15}$ are LOW.

Signals $V_{X1}$–$V_{X15}$ are transmitted along bus line 125 to digital encoder 104. Digital encoder 104 converts the fifteen signals $V_{X1}$–$V_{X15}$ on bus line 125 to a four bit binary code on bus line 161. Output voltage signals $V_{B0}$, $V_{B1}$, $V_{B2}$, and $V_{B3}$ represent the four bit binary code. Bus line 161 includes at least four signal lines, one for each bit.

Figure 9:
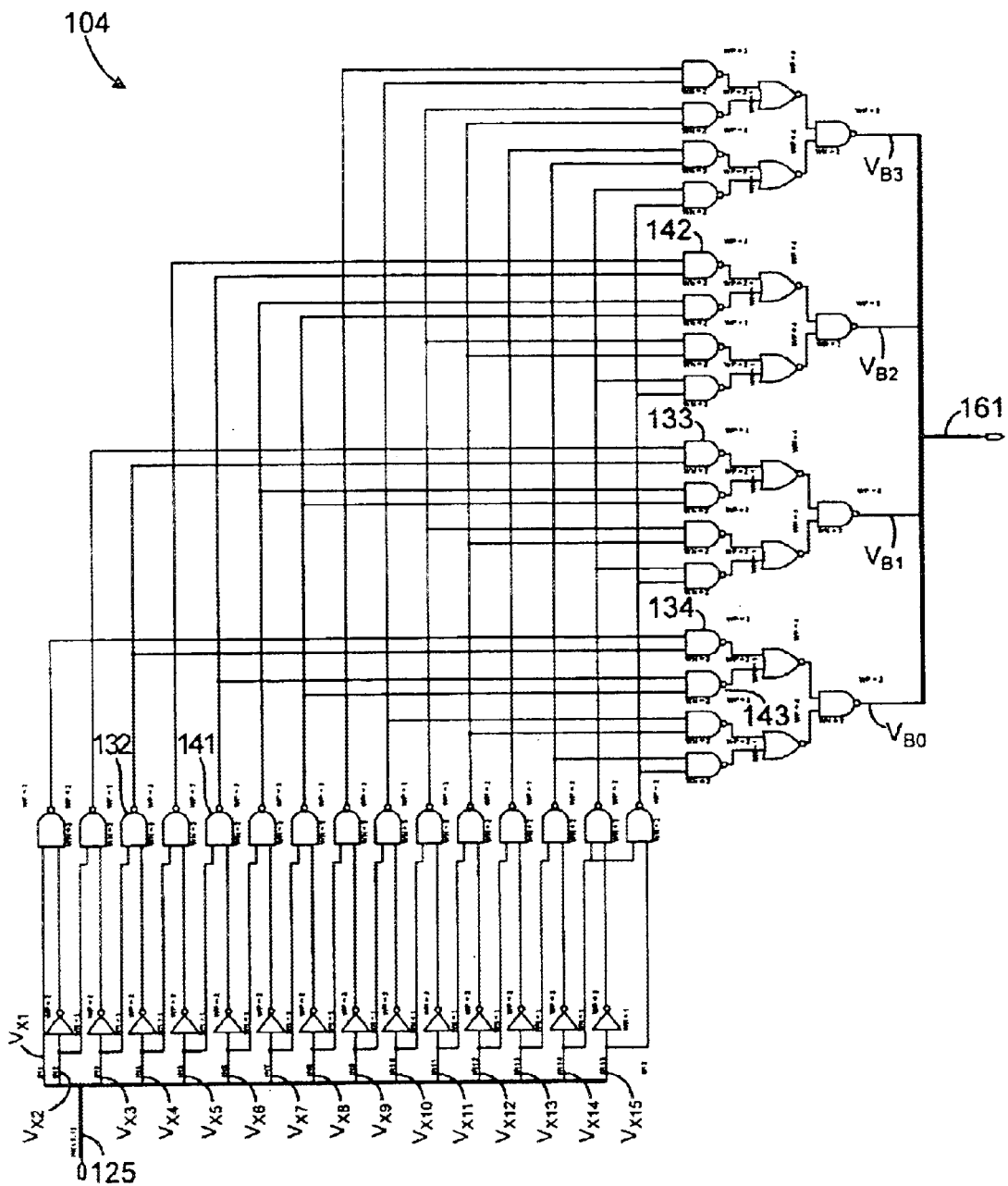
FIG. 9 is a schematic illustrating an embodiment of a digital encoder circuit for use with an on-chip impedance matching circuit, in accordance with the present invention.

An embodiment of digital encoder 104 is shown in FIG. 9. Digital encoder 104 is merely an example of a digital encoder that can be utilized in the present invention. Other digital encoders that convert a plurality of signals to a digital binary code, which are well known in the art, can be used instead.

Digital encoder 104 includes a plurality of logic gates including inverters, NOR gates and NAND gates which determine the value of the binary code on bus line 161. The four bit binary code at signal line 161 has sixteen different states. Fifteen of the sixteen possible states are indicative of unique values for signals $V_{X1-VX15}$. The binary code 0000 is not used, because it would cause all transistors 106–109 to be OFF.

As an example, if $V_{X1}-V_{X3}$ are HIGH, and $V_{X4}-V_{X15}$ are LOW, then the four bit code $[V_{B3}, V_{B2}, V_{B1}, V_{B0}]$ on signal line 161 is 0011. When $V_{X3}$ is HIGH and $V_{X4}$ is LOW, the output signal of NAND gate 132 is LOW, causing the output signals of NAND gates 133 and 134 to go HIGH and $V_{B0}$ and $V_{B1}$ to go HIGH. $V_{B2}$ and $V_{B3}$ are LOW as long as $V_{X4}-V_{X15}$ are LOW.

As another example, if $V_{X1}-V_{X5}$ are HIGH, and $V_{X6}-V_{X15}$ are LOW, then the four bit code $[V_{B3}, V_{B2}, V_{B1}, V_{B0}]$ on signal line 161 is 0101. When $V_{X5}$ is HIGH and $V_{X6}$ is LOW, the output signal of NAND gate 141 is LOW, causing the output signals of NAND gates 142 and 143 to go HIGH and $V_{B0}$ and $V_{B2}$ to go HIGH. $V_{B1}$ and $V_{B3}$ are LOW.

On-chip impedance matching circuit 150 includes four field-effect transistors 106, 107, 108, and 109 coupled in parallel. The drain terminals of transistors 106–109 are coupled to one of the I/O pins of the integrated circuit, and the source terminals of transistors 106–109 are coupled to ground. The gate of transistor 106 is coupled to receive signal $V_{B3}$ on bus 161. The gate of transistor 107 is coupled to receive signal $V_{B2}$ on bus 161. The gate of transistor 108 is coupled to receive signal $V_{B1}$ on bus 161. The gate of transistor 109 is coupled to receive signal $V_{B0}$ on bus 161.

An integrated circuit preferably comprises a plurality of impedance matching circuits 150. Each of the impedance matching circuits 150 are associated with one of the input/output (I/O) pins on the integrated circuit. An integrated circuit may contain as many (or more) impedance matching circuits 150 as there are I/O pins on the chip, wherein each of the impedance circuits 150 is associated with one of the I/O pins on the integrated circuit. Only one impedance matching circuit 150 is shown in FIG. 7 to avoid overcomplicating the drawing. Thus, bus line 161 can drive multiple the impedance matching circuits on the same chip.

FIGS. 6A–6C illustrate examples of configurations for impedance matching circuit 150. Impedance matching circuit 150 can be coupled to an I/O pin or to an I/O buffer as shown in FIGS. 6A–6C with respect to the configuration of impedance matching circuits 21, 22, 41, 42, 61, 62, and 63. Transistors 106–109 may be coupled in parallel between an I/O pin and ground, as shown with respect to circuit 22 in FIG. 6A, or between $V_{CC}$ and an I/O pin, as shown with respect to circuits 21 and 63. Alternatively, transistors 106–109 maybe coupled between ground or $V_{CC}$ and a buffer circuit that is coupled to an I/O pin, as shown with respect to circuits 41, 42, 61, and 62 in FIGS. 6B–6C.

Field-effect transistors 106–109 have channel width-to-length (W/L) aspect ratios that are sized in proportion to the channel width-to-length (W/L) aspect ratio of field-effect transistor 102. For example, in the embodiment shown in FIG. 7, transistor 106 has a W/L ratio that is equal to the W/L ratio of transistor 102. Transistor 107 has a W/L ratio that is one-half the W/L ratio of transistor 102. Transistor 108 has a W/L ratio that is one-quarter the W/L ratio of transistor 102. Transistor 109 has a W/L ratio that is one-eighth the W/L ratio of transistor 102.

The binary bit code represented by signals $V_{B3}, V_{B2}, V_{B1}$, and $V_{B0}$ determines which of transistors 106–109 are ON and which of transistors 106–109 are OFF. A logic HIGH at the gate of one of transistors 106–109 causes that transistor to be ON, and a logic LOW at the gate of one of transistors 106–109 causes that transistor to be OFF. The effective W/L ratio of impedance matching circuit 150 is determined by the transistors 106–109 that are ON. Therefore, the binary code represented by signals $[V_{B3}, V_{B2}, V_{B1}, V_{B0}]$ determines the effective W/L ratio impedance matching circuit 150.

For example, if signals $[V_{B3}, V_{B2}, V_{B1}, V_{B0}]$ represent binary code 1001, then transistors 106 and 109 are ON, and transistors 107–108 are OFF. In this case, the effective W/L ratio of impedance circuit 150 is 1⅛ times the W/L ratio of transistor 102. If signals $V_{B3}, V_{B2}, V_{B1}, V_{B0}]$ represent binary code 0111, then transistors 107–109 are ON, and transistor 106 is OFF. In this case, the effective W/L ratio of impedance circuit 150 is ⅛+¼+½=⅞ times the W/L ratio of transistor 102.

The W/L ratio of impedance circuit 150 determines the effective impedance of impedance matching circuit 150. As the effective W/L ratio of transistors 106–109 increases, the effective impedance of circuit 150 decreases. As the effective W/L ratio of transistors 106–109 decreases, the effective impedance of circuit 150 increases.

The $R_{DS}$ ON resistance of transistor 102 determines the value of the binary code $[V_{B3}, V_{B2}, V_{B1}, V_{B0}]$ on bus 161. The $R_{DS}$ resistance of transistor 102 is sensitive to changes in the temperature of the integrated circuit, voltage changes, and process variations. Thus, as the resistance $R_{DS}$ of transistor 102 changes, the values of signals $V_{X1}-V_{X15}$ on bus 125 and the values of signals $[V_{B3}, V_{B2}, V_{B1}, V_{B0}]$ on bus 161 may also change.

The $R_{DS}$ resistance of transistors 106–109 also changes with variations in process, temperature, and/or voltage, causing the effective impedance of circuit 150 to change. The resistance ratios of resistors 123 are selected so that the effective W/L ratio of circuit 150 compensates for changes in the $R_{DS}$ of transistors 106–109 caused by process, temperature, and voltage variations. As the $R_{DS}$ ON resistance of transistor 102 varies with process, temperature, and/or voltage, the effective W/L ratio of impedance matching circuit 150 may also change according to the bit sequence of binary signals $[V_{B3}, V_{B2}, V_{B1}, V_{B0}]$ in order to minimize changes in the effective impedance of circuit 150.

For example, if the temperature of the integrated circuit increases and the $R_{DS}$ ON resistance of transistor 102 increases with temperature, voltage signal $V_X$ increases. Signal $V_X$ may eventually increase enough to cause more of output signals $V_{X1}-V_{X15}$ go HIGH. The bit sequence of binary signals $[V_{B3}, V_{B2}, V_{B1}, V_{B0}]$ also changes causing different ones of transistors 106–109 to be ON or OFF so that the effective W/L ratio of impedance circuit 150 increases.

For example, if the bit sequence of binary signals $[V_{B3}, V_{B2}, V_{B1}, V_{B0}]$ is 1000, then transistor 106 is ON and transistors 107–109 are OFF. The effective impedance of circuit 150 is determined by an effective W/L ratio of 1 times the W/L ratio of transistor 102. If the ON resistance of transistor 102 increases sufficiently such that the bit sequence of binary signals $[V_{B3}, V_{B2}, V_{B1}, V_{B0}]$ changes to 1001, transistors 106 and 109 are ON and transistors 107–108 are OFF. The effective impedance of circuit 150 is now determined by an effective W/L ratio of 1⅛ times the W/L ratio of transistor 102.

Therefore, the effective channel W/L ratio of impedance circuit 150 is proportional to the $R_{DS}$ resistance of transistor 102. This relationship is designed to compensate for variations in the $R_{DS}$ resistance of transistors 106–109 to minimize changes in the matching impedance provided by circuit 150. For example, process, temperature, and/or voltage variations that cause the $R_{DS}$ resistance of transistor 102 to increase, also cause the $R_{DS}$ resistance of transistors 106–109 to increase. In this case, circuit 100 increases the effective channel W/L ratio of impedance matching circuit 150 to maintain the effective impedance of circuit 150 substantially constant. When temperature, process, and/or voltage variations cause the $R_{DS}$ resistance of transistor 102 to decrease, the $R_{DS}$ resistance of transistors 106–109 also decreases. In this case, circuit 100 decreases the effective channel W/L ratio of circuit 150 to maintain the effective impedance of circuit 150 substantially constant. 1621 Thus, the impedance of impedance matching circuit 150 at each I/O pin is substantially less sensitive to variations in temperature, voltages, and processes. This advantage is achieved without having to connect external off-chip impedance matching resistors at each of the I/O pins on the integrated circuit. Only single off-chip resistor 151 (or alternatively, a small number of off-chip resistors) is connected to the integrated circuit to achieve impedance matching for multiple I/O pins that is less sensitive to process, temperature, and voltage variations. The techniques of the present invention therefore provide impedance matching while using substantially less board space than prior art techniques that require connecting an off-chip resistor to each I/O pin.

In a further embodiment of the present invention, an impedance matching circuit may include more or less than the four transistors 106–109 shown in FIG. 7. For example, an impedance matching circuit may include five transistors coupled in parallel that have channel W/L ratios that are 2, 1, ½, ¼, and ⅛ times the channel W/L ratio of transistor 102, respectively. As another example, an impedance matching circuit may include five transistors coupled in parallel that have channel W/L ratios that are 1, ½, ¼, ⅛, and ¹⁄₁₆ times the channel W/L ratio of transistor 102.

In these examples, binary signals $V_{B3}$, $V_{B2}$, $V_{B1}$, and $V_{B0}$ drive transistors 106–109 as with the embodiment of FIG. 7, and a fifth binary signal drives the fifth transistor. A switch circuit may be provided between the fifth binary signal that drives the gate of the fifth transistor in the impedance matching circuit. The switch circuit enables or disables the fifth transistor for certain I/O pins in response to user input, at specified times, or under certain operating conditions.

Adding a fifth transistor that has ¹⁄₁₆ times the W/L ratio of transistor 102 provides added impedance matching resolution. Adding a fifth transistor that has 2 times the W/L ratio of transistor 102 provides a wider range of impedance matching (i.e., between ½ and 3⅞ W/L ratio). As another example, an impedance matching circuit may contain only three transistors coupled in parallel with W/L ratios such as 1, ⅓, and ⅓, or 1, ½, and ¼ times the W/L ratio of transistor 102.

In a further embodiment, the I/O pins on an integrated circuit may be coupled to impedance matching circuits that have different numbers of transistors. For example, one I/O pin may have an impedance matching circuit that has five transistors coupled in parallel, while the other I/O pins on the integrated circuit each have an impedance matching circuit with only four transistors coupled in parallel. In still further embodiments, field-effect transistors 102, and 106–109 can be substituted with bipolar junction transistors. In still a further embodiment, the digital encoder may be eliminated so that an analog-to-digital converter provides output signals directly to the impedance matching circuits.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the claims.

What is claimed is:

1. An integrated circuit, comprising:
   a first transistor;
   an analog-to-digital converter comprising comparators that compare a voltage at a terminal of the first transistor to a series of resistance values to gene rate $2^N$ output signals in response to the voltage at the terminal of the first transistor;
   a digital encoder circuit coupled to receive the $2^N$ output signals of the comparators, the digital encode circuit encoding the $2^N$ output signals of the comparators into N digital signals that represent an N-bit binary value, the binary value indicating how many of the $2^N$ output signals of the comparators are HIGH; and
   an impedance matching circuit coupled to receive the N digital signals generated by the digital encoder circuit, wherein the impedance matching circuit comprises a plurality of second transistors coupled in parallel that are turned ON or OFF in response to the N digital signals.

2. The integrated circuit of claim 1 wherein the first transistor is coupled to a resistor.

3. The integrated circuit of claim 1 wherein the impedance matching circuit is coupled in parallel with an I/O pin of the integrated circuit.

4. The integrated circuit of claim 1 wherein the impedance matching circuit is coupled in series with an I/O pin of the integrated circuit.

5. The integrated circuit of claim 4 wherein the impedance matching circuit is coupled to a buffer circuit that is coupled to the I/O pin.

6. The integrated circuit of claim 1 further comprising a plurality of impedance matching circuits coupled to receive output signals of the digital encoder circuit, wherein the plurality of impedance matching circuits each comprises a plurality of transistors coupled in parallel.

7. The integrated circuit of claim 1 wherein the analog-to-digital converter comprises a plurality of resistors that set threshold voltages for the plurality of comparators.

8. The integrated circuit of claim 1 wherein the plurality of second transistors of the impedance matching circuit comprises four transistors coupled in parallel.

9. The integrated circuit of claim 1 wherein the plurality of second transistors of the impedance matching circuit comprises five transistors coupled in parallel.

10. A method for providing impedance matching to a pin of an integrated circuit using an impedance matching circuit, the method comprising:

generating a first signal in response to an impedance of a first transistor;

comparing a voltage at a terminal of the first transistor to a plurality of resistances comparators to generate $2^N$ output signals;

encoding the $2^N$ output signals of the comparators into N digital signals that represent a an N-bit binary value, the N-bit binary value indicating how many of the $2^N$ output signals of the comparators are HIGH; and setting an impedance of the impedance matching circuit in response to the N digital signals, wherein the impedance matching circuit is part of the integrated circuit, and the impedance matching, circuit comprises second transistor that are turned ON or OFF in response to the N digital signals.

11. The method of claim 10 wherein generating the first signal comprises generating the first signal from a resistor divider circuit that comprises the first transistor and a resistor.

12. The method of claim 10 wherein the comparators include at least 15 comparators.

13. The method of claim 12 wherein encoding the output signal of the comparators into digital signals that represent the binary value further comprises encoding the comparator output signals into 4 digital signals.

14. The method of claim 13 wherein encoding the output signals of the comparators into digital signals that represent the binary value further comprises performing Boolean NAND functions on the output signals of the comparators.

15. The method of claim 10 wherein the plurality of second transistors comprises at least four transistors coupled in parallel.

16. The method of claim 11 wherein the impedance matching circuit comprises at least five transistors coupled in parallel.

17. The method of claim 10 wherein setting the impedance of the impedance matching circuit further comprises setting the impedance of a plurality of impedance matching circuits wherein each one of the plurality of impedance matching circuits comprises a plurality of transistors coupled in parallel.

18. The method of claim 17 wherein a subset of the impedance matching circuits are coupled in parallel with respect to an associated I/O pin of the integrated circuit.

19. An integrated circuit comprising:

programmable logic circuitry;

a first transistor for generating an analog signal;

an analog-to-digital converter comprising comparators that compare the analog signal to resistance values to generate $2^N$ output signals;

a digital encoder circuit coupled to the analog-to-digital converter, the digital encoder encoding the $2^N$ output signals of the comparators into N digital signals that represent an N-bit binary value, the binary value indicating how many of the $2^N$ output signals of the comparators are HIGH; and an impedance matching circuit comprising a plurality of second transistors, wherein each of the second transistors is coupled to receive one of the N digital signals, and the second transistors are turned ON or OFF in response to the N digital signals.

20. The integrated circuit of claim 19 further comprising a plurality of impedance matching circuits, each comprising a plurality of transistors that are each coupled to receive one of the digital signals.

21. The integrated circuit of claim 20 wherein each of the impedance matching circuits are associated with an I/O pin of the integrated circuit.

22. The integrated circuit of claim 21 wherein a subset of the impedance matching circuits are coupled to a buffer circuit.

23. The integrated circuit of claim 21 wherein a subset of the impedance matching circuits are coupled in parallel with an associated one of the I/O pins.

24. The integrated circuit of claim 19 wherein the digital encoder circuit further comprises a plurality of NAND gates and NOR gates.

25. The integrated circuit of claim 19 wherein the first transistor is coupled to an off-chip resistor, and wherein the first transistor and the off-chip resistor form a resistor divider.

26. The integrated circuit of claim 19 wherein the plurality of second transistors comprises at least four transistors coupled in parallel.

* * * * *